April 10, 1945.  E. G. MARINETTI  2,373,586
SAFETY CLASP PIN
Filed Oct. 4, 1943  2 Sheets-Sheet 1

Inventor
Edward G. Marinetti
By Thomas A. Jenckes
Attorney

April 10, 1945.  E. G. MARINETTI  2,373,586
SAFETY CLASP PIN
Filed Oct. 4, 1943  2 Sheets-Sheet 2

*Inventor*
*Edward G. Marinetti*
By Thomas A. Jenkes
*Attorney*

Patented Apr. 10, 1945

2,373,586

UNITED STATES PATENT OFFICE 2,373,586

SAFETY CLASP PIN

Edward Gioseph Marinetti, East Providence, R. I.

Application October 4, 1943, Serial No. 504,974

10 Claims. (Cl. 24—162)

My invention relates to safety clasp pins. An object of my invention is to provide a device for fastening fabric articles together which has the advantages of both a pin and a clasp. Clasps which depend for their clasping action alone on a clamping action have often tended to slip in use and to retain them in position it has been necessary to provide some type of locking means therefor. For pins it has been necessary to provide both a guard and a catch.

A further object of my invention is to provide a device in which the clamping features thereof provide a suitable guard for the pin and in which the pin features thereof provide a suitable catch or lock for the clasp.

In general my invention is an improvement on safety pins but it is more practical than a safety pin as it functions additionally as a clasp. It is safer than a safety pin as the clasp features protect the pin both in open and closed positions.

A further object of my invention is to provide a pin in which the pin itself is so guarded in open or closed position that it can never stick into anyone and even if swallowed the pin is so covered that it would not pierce any human organ.

A further feature of my invention is to provide a device in which the pin feature thereof not only forms a positive lock to hold the clasp in position, but additionally provides the clasp for preventing movement thereof in use.

My invention is particularly adapted for use in attaching diapers to children, making a bath towel into bathing trunks, attaching any two fabrics together for any purpose whether they be articles of clothing or otherwise, in pinning drapes or curtains together, etc.

A further object of my invention is to provide a novel type of clasp which may be made of any suitable material bent into flat formation, such as flat stock, wire bent upon itself into parallel even runs and one which, if desired, may be completely covered with suitable plastic or other material resistant to body sweat so as to permit the use of the pin, if desired, immediately adjacent the body of the wearer.

A further object of my invention, therefore, is to provide a pin clasp which is so safe that it may be employed immediately adjacent the body of the wearer.

These and such other objects of my invention as may hereinafter appear will be best understood from a description of the embodiments thereof shown in the accompanying drawings.

In the drawings.

In the drawings, wherein like characters of reference generally indicate like parts throughout, 10 generally indicates a clasp pin constructed in accordance with my invention.

Figure 5:
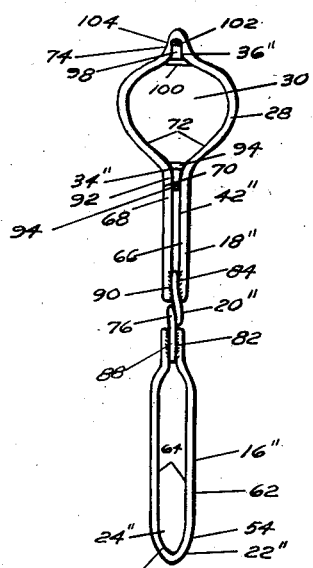
Fig. 5 is a plan view similar to Fig. 4 of the clasp or body portion of a different embodiment of my invention constructed essentially of bent wire prior to being bent to form the clasping jaws.
Figure 7:
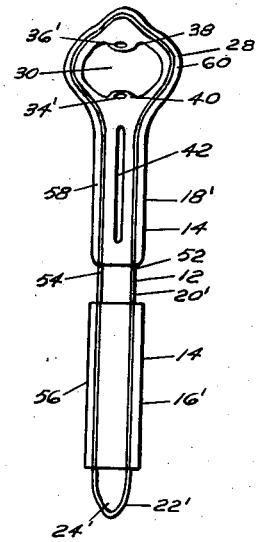
Fig. 7 is a plan view similar to Figs. 4 and 5 of a clasp or body portion of a different embodiment of my invention having a wire skeleton and a plastic covering, prior to being bent to form the clasping jaws.
Figure 6:
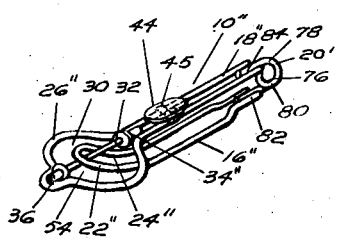
Fig. 6 is a perspective view similar to Fig. 2 of the embodiment of my invention shown in Fig. 5.
Figure 8:
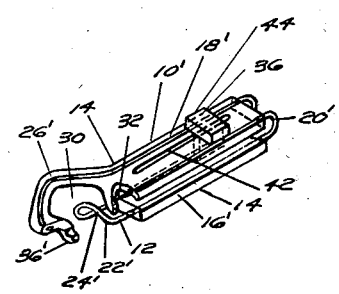
Fig. 8 is a perspective view of the embodiment of my invention shown in Fig. 7, partially broken away.

The essential features of my invention are the same in all three embodiments shown respectively in Figs. 1-4, 5-6, and 7-8 with the exception that in the embodiment shown in Figs. 1-4 the clasp or body portion is preferably constructed of stamped flat stock, in the embodiment shown in Figs. 5 and 6 the clasp or body portion is constructed of spaced parallel runs of wire to provide the substantially flat upper and lower jaws and in the embodiment shown in Figs. 7 and 8 a similar wire skeleton and a protective plastic covering around all portions thereof contacting the body of the wearer in use are provided. In all embodiments the slidable pin and its moving means are substantially identical. I, therefore, in the claims employ the words "flat resilient material" to include flat stock, spaced runs of wire parallel to each other to provide a flat surface or any other material including a plastic covering in which the exposed inner and outer surfaces thereof function evenly.

My improved clasp pin includes a clasp or body portion 10 constructed of flat resilient material, in the embodiments shown in Figs. 1-4 being constructed of flat stock. In the embodiment shown in Figs. 5 and 6 the clasp or body portion 10" is constructed of parallel runs of wire and in the embodiment shown in Figs. 7 and 8 the clasp or body portion 10' has a wire skeleton 12 and a plastic covering 14 around all portions thereof contacting the body of the wearer in use. The clasp or body portion 10, 10' or 10" is preferably bent upon itself substantially centrally thereof to provide a lower jaw 16, 16' or 16" and an upper jaw 18, 18' or 18" joined to the said lower jaw by a resilient hinge 20, 20' or 20", said upper jaw 18, 18' or 18" overlying said lower jaw 16, 16' or 16" to clasp the fabric between them. Said lower jaw 16, 16' or 16" is provided with an upwardly projecting outer end 22, 22' or 22" having an orifice 24, 24' or 24" therein and said upper jaw 18, 18' or 18" is provided with an outer end 26, 26' or 26" spread open widely as at 28 and having an open center portion 30.

An essential feature of my clasp pin comprises the fact that the means for retaining said clasp in clasping position comprises a pin 32. Said pin 32 is mounted on said upper jaw 18, 18' or 18" to be axially movable back and forth underneath said upper jaw from a releasing position towards the inner end of said upper jaw to a locking position adjacent the outer end of said upper jaw. In the claims and in the specification I employ the word "inner" in reference to the hinge 20, 20' or 20" and the word "outer" relative to the opposite overlying respective ends of said upper and lower jaws 18, 18' or 18" and 16, 16' or 16".

Figure 1:
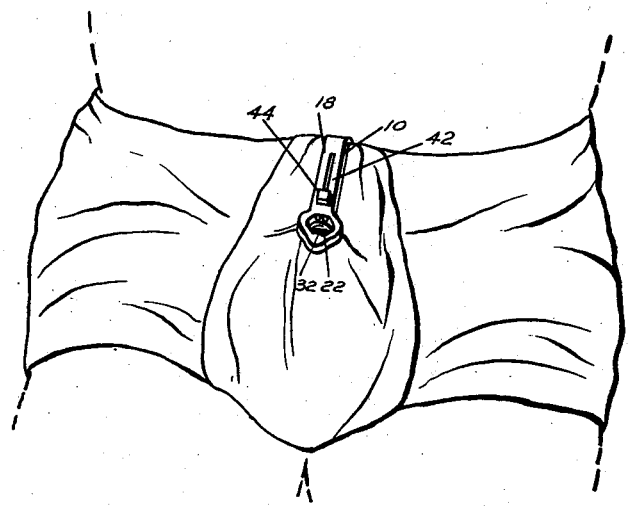
Fig. 1 is a front elevation illustrating one embodiment of my improved clasp pin employed to secure a garment, such as a diaper or towel around the body of the wearer.
Figures 2, 3:
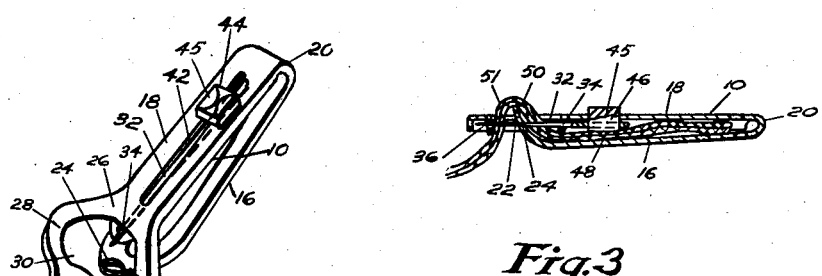
Fig. 2 is a perspective view of the embodiment of clasp pin shown in Fig. 1.
Fig. 3 is a longitudinal sectional view thereof illustrating the clasp pin attached to an article of apparel.
Figure 4:
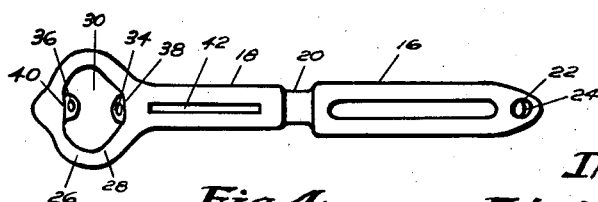
Fig. 4 is a plan view of the clasp or body portion of the clasp pin prior to being bent centrally to form two clasping jaws in use.

I also provide catch means for said pin comprising alignable orifice means on the upper and lower jaws 18, 18' or 18" and 16, 16' or 16" respectively for receiving the free end of the pin when the jaws 16, 16' or 16" and 18, 18' or 18" are moved to clasping position and the pin 32 is moved to its outer retaining position. In the embodiment shown, said catch means comprise the orifice 24, 24' or 24" on the upturned outer end 22, 22' or 22" of the lower jaw 16, 16' or 16" and the aligned orifice means 34, 34' or 34" and 36, 36' or 36" respectively on the respective inner and outer edges of the center portion of the open portion 30 at the outer end of said upper jaw 18, 18' or 18", adapted to receive the pin when it has been urged outwardly underneath said upper jaw after the upper and lower jaws 18, 18' or 18" and 16, 16' or 16" are moved respectively to clasping position shown in Fig. 2, with the upturned outer end 22, 22' or 22" of the lower jaw pushing the fabric upwardly through said open portion 30 so that it can be readily pierced by the pin 32 as shown in Fig. 3. In all embodiments I preferably provide means such as a handle 44 operable from the upper surface of said upper jaw 18 for moving said pin 32 to said respective positions.

As stated, the clasp or body portion in the embodiment shown in Figs. 1–4 is made of a strip of flat resilient material in which the hinge 20 is preferably integral with the upper and lower jaws 16 and 18. The orifices 34 and 36 are provided on suitable extensions 38 and 40 projecting inwardly from the open portion 30 of said upper jaw.

As stated, the pin means is the same in all embodiments and for this purpose the upper jaw is provided with a longitudinal slot 42, extending from points substantially adjacent said hinge 20 and said open outer portion 30. The combination pin mount and handle 44 is provided with a handle portion 45 movable over the upper surface of the upper jaw, a thin portion 46 projecting downwardly through said slot 42 and a pin mounting portion 48 below said upper jaw 18. These portions may be constructed in any suitable manner of any suitable material. In the embodiment shown, however, they are constructed of a split rivet having two tongues projecting downwardly therefrom respectively adapted to overlap the inner end of the pin 32 and being bent on themselves to form part of the narrow portion 46 extending upwardly through said slot 42 and terminating in the tips shown overlying the rivet end. The narrow portion 46 thus includes a downward run and an upward run of each rivet leaf or tongue. The pin 32 is of such a length and so mounted on the mounting means 44 that when the handle 45 is moved to its foremost position in the slot 42 the pin passes through the respective orifices 34 on the inner edge of the open portion 30 of the upper jaw 18, the orifice 24 on the upturned outer end of the lower jaw and the orifice 36 on the outer edge of the open portion 30 of said upper jaw and when the pin mounting means 44 is moved to its innermost position in the slot 42 the pin 32 will be withdrawn entirely out of said orifices and open portion 30 and is completely concealed and protected in use between and by the respective upper and lower jaws 18 and 16. It is obvious that when the pin 32 is retracted to its innermost position, the upwardly projecting fold or loop of cloth 50, shown in Fig. 3, forced upwardly through the open portion 30 of the upper jaw by the upwardly projecting end 22 of the lower jaw as at 51, when the jaws are moved to clamping position and retained in use in said position by the outer end of the pin 32, may be readily withdrawn through the open outer end 30 of said upper jaw.

The embodiments shown in Figs. 5, 6, 7 and 8 constructed essentially of bent wire. In the embodiment shown in Figs. 7 and 8 the skeleton frame 52 is constructed essentially of parallel runs of a single piece of resilient wire 54 bent into a narrow generally oblong shape having the upwardly projecting loop 22' at one end thereof and the enlarged loop 28 forming the open center portion 30 at the opposite end thereof bent upon itself as at 20' to provide the lower jaw 16' and the upper jaw 18' integrally joined together by the resilient hinge 20'. When so bent it is apparent that the upper jaw 18' is provided with parallel runs of wire forming an enlarged outer end 28 having the open center portion 30 for receiving the outer end of said lower jaw. In this embodiment, I provide a body 56 of sweat-resisting plastic material covering the respective runs of wire substantially from said hinge 20 to said upwardly projecting portion or loop 22' and forming a body for said lower jaw providing the orifice 24' at the outer end of said loop.

I also provide a body 58 of sweat-resisting plastic material covering the runs of wire from the hinge 20 to the open outer portion 30 of said upper jaw 18' and an integral covering 60 of plastic material extending around the loop 28 of said enlarged portion of said upper jaw. Any suitable type of plastic of the phenol-formaldehyde condensation type, urea formaldehyde condensation type, styrene type, acetate type or other types sold under various trade names, rubber, flexible glass, or other suitable plastic materials may be employed.

In this embodiment the longitudinal slot 42 may be readily formed in said body 58 and the respective orifices 34' and 36' may be suitably formed on suitable extensions 38 and 40 projecting radially inwardly of said open portion 30 from said body portion 58 and integral covering 60. In this embodiment the pin mount and pin are constructed in identical fashion as described in the embodiment shown in Figs. 1-4.

The embodiment shown in Figs. 5 and 6 is generally similar to the embodiment shown in Figs. 7 and 8 with the exception that the plastic sweat-resisting body portions 56 and 58 and covering 60 are omitted and due to their omission it is necessary to add suitable means to the wire for providing the orifices 34 and 36. In this embodiment, the runs of wire may be conveniently so spaced as to form the longitudinal slot 42". While the entire device may be made of a single run of wire, I preferably construct the embodiment composed of wire shown in Figs. 5 and 6, specifically in the following manner: The lower jaw 16" comprises a piece of wire 62 bent into a loop having free inner ends and comprising spaced parallel runs of wire 64 centrally and adjacent the outer end thereof tapering as at 66 adjacent each other to the outer end thereof with said outer end 22" bent upwardly to provide the upwardly projecting loop 54 forming the orifice 24" therein. An upper jaw comprising a piece of wire 66 bent into a loop 68 having closely spaced parallel runs 70 extending from the inner towards the outer end and terminating in semi-circular bends 72 forming the central open portion 30 at the outer end thereof with the tip 74 thereof contracted. I also provide a resilient hinge member 76 for joining said upper and lower jaws together preferably comprising a piece of resilient wire 78 bent into a vertically extending substantially double loop 80 with the respective lower and upper ends 82 and 84 thereof projecting outwardly at spaced distances with the lower end thereof interposed between the spaced runs 64 of wire at the inner end of the lower jaw 16" and soldered thereto by the solder 88 and the upper end 84 thereof interposed between the runs of wire 66 at the inner end of the upper jaw 18" and soldered thereto by the solder 90. To provide the respective orifices 34" and 36" at the inner and outer edges of the open center portion 30 of the upper jaw 18, I provide a hollow rivet 92 having its head 94 at the inner edge of the open portion at the outer end of the upper jaw 18" and its hollow body 92 projecting between the runs of wire 66 of said upper jaw and soldered thereto by the solder 94, thus forming the axial slot 42" in said upper jaw between the end of said rivet 92 and the outer end of said hinge end 84. The opposite orifice 36" is provided by inserting the hollow rivet 98 so that the head 100 thereof faces the open outer portion of said upper jaw and its body 102 is contained between the runs of wire at the tip 74 of said upper jaw and soldered thereto by the solder 104. In this embodiment also the pin mounting means 36 is constructed in similar fashion as in the other embodiments, the end of the pin 32 passing through the respective hollow rivets 92 and 98 and open loop end 22" to secure the pin in pinning position and functioning as a catch to hold the upper and lower jaws of the clasp together. It is thus obvious that each embodiment functions in similar fashion.

As stated heretofore the device may be employed for securing any number of folds or layers of fabric to each other. The pin features of my improved clasp pin function to secure the clasp jaws together and the clasp jaws function as a guard and a catch for the pin.

It is apparent therefore that I have provided a novel type of clasp pin with the advantages described above.

It is understood that my invention is not limited to the specific embodiments shown and described and various deviations may be made therefrom without departing from the spirit and scope of the appended claims.

What I claim is:

1. A safety clasp pin, comprising a clasp made of flat resilient material, and having a plastic covering around all portions thereof contacting the body of the wearer in use, bent upon itself to provide a lower jaw and an upper jaw joined to said lower jaw by a resilient hinge and overlying said lower jaw to clasp fabric between them, said lower jaw having an upwardly projecting outer end and said upper jaw having an enlarged outer end having an open center portion, and means for retaining said clasp in clasping position, comprising a pin mounted on said upper jaw to be axially movable back and forth underneath said upper jaw from a releasing position towards the inner end of said jaw to a locking position adjacent the outer end of said jaw and catch means for said pin comprising alignable orifice means on said upper and lower jaws for receiving the free end of the pin when the jaws are moved to clasping position and the pin is moved to its outer retaining position.

2. A safety clasp pin, comprising a clasp made of flat resilient material, and having a plastic covering around all portions thereof contacting the body of the wearer in use, bent upon itself to provide a lower jaw and an upper jaw joined to said lower jaw by a resilient hinge and overlying said lower jaw to clasp fabric between them, said lower jaw having an upwardly projecting outer end and said upper jaw having an enlarged outer end having an open center portion, and means for retaining said clasp in clasping position, comprising a pin mounted on said upper jaw to be axially movable back and forth underneath said upper jaw from a releasing position towards the inner end of said jaw to a locking position adjacent the outer end of said jaw and catch means for said pin comprising alignable orifice means on the inner and outer edges of the open portion of said upper jaw and on the outer end of said lower jaw projecting upwardly within said open portion of said upper jaw for receiving the free end of the pin when the jaws are moved to clasping position and the pin is moved to its outer retaining position.

3. A safety clasp pin, comprising a clasp made of flat resilient material, and having a plastic covering around all portions thereof contacting the body of the wearer in use, bent upon itself to provide a lower jaw and an upper jaw joined to said lower jaw by a resilient hinge and overlying said lower jaw to clasp fabric between them, said lower jaw having an upwardly projecting outer end and said upper jaw having an enlarged outer end having an open center portion, and means for retaining said clasp in clasping position, comprising a pin mounted on said upper jaw to be axially movable back and forth underneath said upper jaw from a releasing position towards the inner end of said jaw to a locking position adjacent the outer end of said jaw, catch means for said pin comprising alignable orifice means on said upper and lower jaws for receiving the free end of the pin when the jaws are moved to clasping position and the pin is moved to its outer retaining position and means operable from the upper surface of said upper jaw for moving said pin to said respective positions.

4. A safety clasp pin, comprising a clasp made of flat resilient material, bent upon itself to provide a lower jaw and an upper jaw joined to said lower jaw by a resilient hinge and overlying said lower jaw to clasp fabric between them, said lower jaw having an upwardly projecting outer end and said upper jaw having an enlarged outer end having an open center portion, and means for retaining said clasp in clasping position, comprising a pin mounted on said upper jaw to be axially movable back and forth underneath said upper jaw from a releasing position towards the inner end of said jaw to a locking position adjacent the outer end of said jaw and catch means for said pin comprising alignable orifice means on said upper and lower jaw for receiving the free end of the pin when the jaws are moved to clasping position and the pin is moved to its outer retaining position.

5. A safety clasp pin, comprising a clasp made of flat resilient material, bent upon itself to provide a lower jaw and an upper jaw joined to said lower jaw by a resilient hinge and overlying said lower jaw to clasp fabric between them, said lower jaw having an upwardly projecting outer end and said upper jaw having an enlarged outer end having an open center portion, and means for retaining said clasp in clasping position, comprising a pin mounted on said upper jaw to be axially movable back and forth underneath said upper jaw from a releasing position towards the inner end of said jaw to a locking position adjacent the outer end of said jaws and catch means for said pin comprising alignable orifice means on the inner and outer edges of the open portion of said upper jaw and on the outer end of said lower jaw projecting upwardly within said open portion of said upper jaw for receiving the free end of the pin when the jaws are moved to clasping position and the pin is moved to its outer retaining position.

6. A safety clasp pin, comprising a clasp made of flat resilient material, bent upon itself to provide a lower jaw and an upper jaw joined to said lower jaw by a resilient hinge and overlying said lower jaw to clasp fabric between them, said lower jaw having an upwardly projecting outer end and said upper jaw having an enlarged outer end having an open center portion, and means for retaining said clasp in clasping position, comprising a pin mounted on said upper jaw to be axially movable back and forth underneath said upper jaw from a releasing position towards the inner end of said jaw to a locking position adjacent the outer end of said jaw, catch means for said pin comprising alignable orifice means on said upper and lower jaws for receiving the free end of the pin when the jaws are moved to clasping position and the pin is moved to its outer retaining position and means operable from the upper surface of said upper jaw for moving said pin to said respective positions.

7. A safety clasp pin, comprising a clasp made of a strip of flat resilient metal having an upwardly projecting end having an axial orifice therein and an enlarged opposite end having an open center portion bent upon itself centrally thereof to provide a lower jaw and an upper jaw integrally joined together by a resilient hinge with said upper jaw having an enlarged outer end having an open center portion for receiving the outer end of said lower jaw, having axially aligned orifices on the inner and outer edges thereof and an axial slot therein extending substantially from said hinge to said outer open position, a combination pin mount and handle having a handle position movable over the upper surface of the upper jaw, a portion projecting downwardly through said slot and a pin-mounting portion below the said upper jaw and a pin mounted on said pin-mounting portion movable axially from a releasing position towards the inner end of said upper jaw to a locking position adjacent the outer end of said jaw extending through said aligned orifices in said upper jaw and said orifice in the outer end of said lower jaw when said jaws are compressed to clasping position, with said orifices and jaws providing a catch and guard for said pin.

8. A safety clasp pin, comprising a clasp having a skeleton frame comprising a piece of resilient wire bent into a narrow generally oblong shape having an upwardly projecting loop at one end thereof and an enlarged loop at the opposite end thereof, bent upon itself centrally thereof to provide a lower jaw and an upper jaw integrally joined together by a resilient hinge with said upper jaw having an enlarged open outer end having an open center portion for receiving the outer end of said lower jaw, a body of sweat-resisting plastic material covering the runs of wire substantially from said hinge to said upwardly projecting portion forming a body for said lower jaw, a body of sweat-resisting plastic material covering the runs of wire from the hinge to the open outer portion of said upper jaw having a central axial slot therein an an integral covering of plastic material extending therefrom around the loop of said enlarged portion of said upper jaw having axially aligned orifices on the inner and outer edges thereof surrounding said open portion, a combination pin-mount and handle having a handle portion movable over the upper surface of the upper jaw, a portion projecting downwardly within said slot and a pin-mounting portion below the said upper jaw and a pin mounted on said pin-mounting portion movable axially from a releasing position towards the inner end of said upper jaw to a locking position adjacent the outer end of said jaw extending through said aligned orifices in said upper jaw and said loop in the outer end of said lower jaw when said jaws are compressed to clasping position with said orifices and jaws providing a catch and guard for said pin.

9. A safety clasp pin, comprising a clasp comprising resilient wire bent into a narrow generally oblong shape having an upwardly projecting loop at one end thereof and an enlarged loop at the opposite end thereof, bent upon itself substantially centrally thereof to provide a lower jaw and an upper jaw joined together by a resilient hinge with said upper jaw having an enlarged open outer end having an open center portion formed by said loop for receiving the upwardly projecting loop at the outer end of said lower jaw, aligned orifice means mounted on said wire at the center portions of the inner and outer edges of the enlarged loop of said upper jaw, a combination pinmount and handle having a handle portion movable over the upper surface of the upper jaw, a portion projecting downwardly between the runs of wire of said upper jaw intermediate said enlarged loop and hinge and a pin-mounting portion below the said upper jaw and a pin mounted on said pin-mounting portion movable axially from a releasing position towards the inner end of said upper jaw to a locking position adjacent the outer end of said jaw extending through said aligned orifices in said upper jaw and said loop in the outer end of said lower jaw when said jaws are compressed to clasping position with said orifices and jaws providing a catch and guard for said pin.

10. A safety clasp pin, comprising a lower jaw comprising piece of wire bent into a loop having parallel spaced runs of wire centrally and at the outer end thereof tapering to adjacent each other at the inner end thereof with said outer end bent upwardly to provide an upwardly projecting loop, an upper jaw comprising a piece of wire bent into a loop having closely spaced parallel side walls extending from the inner towards the outer end thereof and terminating in semi-circular bends forming a central open portion at the outer end thereof with the tip thereof contracted and a resilient hinge for joining said upper and lower jaws together comprising a resilient piece of wire bent into a vertical substantially double circular loop with the upper and lower ends thereof projecting outwardly at spaced distances with the lower end thereof interposed between and soldered to the spaced runs of wire at the inner end of the lower jaw and the upper end interposed between and soldered to the runs of wire at the inner end of the upper jaw, a hollow rivet having its head at the inner edge of the open portion at the outer end of the upper jaw and its body projecting between and soldered to the runs of wire of said upper jaw, forming an axial slot in said upper jaw between the inner end of said rivet and the outer end of said hinge end and a hollow rivet having its head facing the open outer portion of said upper jaw and its body contained between and soldered to the runs of wire at the tip of said outer jaw, a combination pin-mount and handle having a handle portion movable over the upper surface of the upper jaw, a portion projecting downwardly within said slot and a pin-mounting portion below the said upper jaw and a pin mounted on said pin-mounting portion movable axially from a releasing position towards the inner end of said upper jaw to a locking position adjacent the outer end of said jaw extending through said aligned hollow rivets in said upper jaw and said loop in the outer end of said lower jaw when said jaws are compressed to clasping position with said orifices and jaws providing a catch and guard for said pin.

EDWARD GIOSEPH MARINETTI.